United States Patent Office 3,520,928
Patented July 21, 1970

3,520,928
HYDROGENATION OF PHENYLPRIMARY AMINES TO CYCLOHEXYL AMINES
Nicholas P. Greco, Pittsburgh, Pa., assignor to Koppers Company, Inc., a corporation of Delaware
No Drawing. Filed Aug. 25, 1967, Ser. No. 663,235
Int. Cl. C07b *1/00;* C07c *85/00*
U.S. Cl. 260—563                        7 Claims

ABSTRACT OF THE DISCLOSURE

Alicyclic primary amines are prepared by low pressure hydrogenation of mineral acid salts of aromatic primary amines in aqueous solution, using an acid-resistant catalyst such as a platinum or palladium catalyst. The salt can be preformed or formed in situ by the addition of at least one equivalent of a mineral acid per amine group on the starting aromatic primary amine. The alicyclic primary amines, useful in producing urethanes, are formed by an economical and highly efficient process which substantially eliminates by-product formation and by using an aqueous media for hydrogenation, removes dangers associated with using organic solvents.

BACKGROUND OF THE INVENTION

Numerous attempts have been made to produce alicyclic primary amines by an economical and efficient method. Prior processes have either resulted in the formation of by-products, such as those formed by coupling, or have required the use of exceptionally high temperatures and pressures.

Whitman, for example, in U.S. 2,606,925 uses a ruthenium catalyst to hydrogenate nitroaromatic compounds, but yields of about seventy-five percent indicate that coupling is occurring, which results in loss of starting material. In the comprehensive article by Rylander, Solvents in Platinum Metal Catalyzed Hydrogenations, Engelhard Industries, Inc. Technical Bulletin, Vol. V, No. 1, June 1964, it is taught that minor amounts of acid will nullify the poisoning effect of amine substrates, but no process where coupling is eliminated and where greater than one equivalent of acid per amine group of an aromatic amine is used or is even remotely suggested.

SUMMARY OF THE INVENTION

According to the process of the present invention, alicyclic primary amines are prepared by aqueous liquid-phase hydrogenation of the corresponding aromatic primary amine mineral acid salt in the presence of an acid-resistant catalyst such as a palladium or platinum catalyst. The hydrogenation is effected in aqueous solution and the amine must contain at least one equivalent of a mineral acid per amine group of the aromatic primary amine. The hydrogenation is carried out at a temperature of 20–250° C. and a pressure of 5–200 pounds per square inch of hydrogen. Upon completion of hydrogen uptake, the aqueous solution is neutralized and the alicyclic primary amine recovered therefrom by any convenient means.

DETAILED DESCRIPTION

The term aromatic primary amine, as used herein, includes both the mono-amino aromatic compounds and the di-amino aromatic compounds. Illustrative of these are aniline, the anisidines, the aminobiphenyls and naphthylamines and the diaminobenzenes, such as ortho-phenylenediamine, meta-phenylenediamine, and para-phenylenediamine; and the diaminobiphenyls such as benzidine, 2,4'-diaminobiphenyl and the like.

The aromatic primary amines useable in the present process may also contain substituents on the aromatic ring which will remain intact using the low temperatures and pressures as herein described. Examples of such substituents would be hydroxyl or carboxylic acid groups attached to the aromatic ring in addition to the primary amine groups. Examples of such compounds are ortho-aminophenol, meta-aminophenol, para-aminophenol, anthranilic acid, meta-aminobenzoic acid and para-aminobenzoic acid.

The aromatic primary amine to be hydrogenated is admixed with an aqueous solution of a strong mineral acid to form the salt thereof. This salt may be preformed, or it can be formed in situ by the addition of the mineral acid to the amine suspended in water to be used in the hydrogenation. The use of water as solvent during the hydrogenation eliminates many of the problems associated with various processes using organic solvents, for example, flammability, explosibility, and problems associated with interaction of the organic solvents with the starting material or product to form by-products and reduce the yield of desired alicyclic primary amine.

The acids are the strong mineral acids such as hydrochloric acid, sulfuric acid and phosphoric acid which are infinitely soluble in aqueous solution and which form water soluble inorganic salts upon neutralization of the reaction mixture following hydrogenation. This enables easy separation of the salts from the alicyclic primary amine product. It has been found that the use of organic acids such as acetic acid do not provide the results obtained when mineral acids are used and thus, such organic acids should be avoided.

The amount of acid necessary to form the salts useable in the present process is at least one equivalent of acid per amine group on the aromatic primary amine which is to be hydrogenated. It is preferable that at least one mole of acid be used per mole of aromatic primary amine because of the fact that the half salts of such amines are less water soluble than the full salt of the amine. An equivalent amount may be used, however, such as one mole of sulfuric acid per mole of an aromatic diamine. The amine salts are soluble in the aqueous solution, and the hydrogenation is carried out in a liquid phase. An excess of the acid may be used without detriment, but economical consideration results in the desirability of using about one to five equivalents of acid per amine group on the aromatic primary amine. The aqueous solution of the aromatic primary amine salt containing at least one equivalent of acid may be formed by first reacting the amine with the acid to form the aqueous solution used in the present hydrogenation process.

The aromatic primary amine salt in aqueous acidic solution, containing at least one equivalent of acid per amine group of said aromatic primary amine, is transferred to a hydrogenation vessel and the hydrogenation catalyst added thereto. The vessel is closed and a hydrogen containing gas fed into the vessel at desired pressures. Preferably, the gas is substantially all hydrogen. The vessel may, if desired, be agitated and heated during the hydrogenation reaction. After the hydrogenation reaction is complete, the vessel is cooled and the excess hydrogen is removed. Then, the aqueous solution is filtered to remove catalyst, and the aqueous solution neutralized. The neutralization springs the alicyclic primary amine which is separated from the aqueous solution.

Catalysts used in the process are the acid resistant hydrogenation catalysts, platinum and palladium, and oxides or salts of these. A readily available and preferred catalyst is platinum oxide. The catalysts may be in solid form or supported on suitable carriers.

A unique aspect of the present process is that the aqueous acidic solutions of aromatic primary amines are hydrogenated to alicyclic primary amines at low positive pressures. Positive pressures of hydrogen as little as five pounds per square inch are effective in the process enabling hydrogenation in conveniently available low pressure apparatus, and do not require the use of high pressure, expensive equipment. Increased positive pressures may be used such as about 200 pounds per square inch, if desired, but such pressures are not needed. The low pressure, below about 100 pounds per square inch are preferred because of the ease of the reaction at these pressures in conventional equipment.

The process also employs moderate temperatures for the hydrogenation and thus does not require expensive high-temperature apparatus. Temperatures in the order of ambient temperatures up to about 250° C. may be used, but preferably temperatures between about 50–150° C. are used. The hydrogenation proceeds rapidly and without by-product formation at about 100° C.

Since the process uses an aqueous media, the amine products are easily separated therefrom by neutralizing the acid solutions and extracting the amine by a suitable solvent. Such solvents are those which dissolve the organic amine, but are themselves relatively insoluble in water. Examples of such solvents are ethyl ether or the aromatic solvents such as benzene, toluene, and xylene. Or, the amine salt may be recovered from the mixture by filtering off the catalyst and concentrating the aqueous phase with freeing of the amine to be done at a subsequent step.

The present process is unique in that no coupling products are formed during the hydrogenation process. Conventional hydrogenations of aromatic primary amines, as a matter of course, result in some coupling of the starting compound and consequently, a reduction in the yield of the desired alicyclic primary amine. By following the present process, such coupling is eliminated and a substantially quantitative yield of the desired alicyclic primary amine results.

My process is further illustrated by the following examples.

EXAMPLE I

One hundred grams (0.93 mole) of ortho-aminophenol sulfate, formed by the addition of equimolar quantities of ortho-aminophenol and sulfuric acid, was dissolved in 500 ml. of water and charged to a glass-lined autoclave with 1 gram of platinum. The autoclave was equipped with a metal stirrer coated with Teflon and a metal thermocouple well protected with a glass tube. After purging the autoclave with nitrogen, 200 p.s.i. of hydrogen gas was charged. The autoclave was heated to 55° C. at which temperature hydrogen absorption was rapid. The pressure in the autoclave dropped to 2 p.s.i. The hydrogen pressure was replenished as needed until absorption ceased. The total reaction time was 20 minutes. The reaction solution was cooled, removed from the autoclave and filtered. The hydrogenate was a water-white liquid after filtering off the catalyst. The aqueous solution was made alkaline with aqueous sodium hydroxide and the oil formed was extracted with ether. The ether was evaporated to give 65 grams (97%) of crude product. The crude product was distilled at 23 mm. mercury pressure to give 60 grams (90%) of ortho-aminocyclohexanol consisting of a mixture of stereoisomers (B.P. range 82–123° C./23 mm.).

EXAMPLE II

A solution was formed by admixing 100 parts of water and 10 parts (0.093 mole) of meta-phenylenediamine and adding thereto concentrated hydrochloric acid (0.22 mole). The resulting solution was charged to a laboratory glass shaker hydrogenation apparatus and 0.5 part of 10 percent palladium on carbon added as catalyst. The system, after purging with nitrogen and then with hydrogen, was heated to 100° C. and hydrogenated under an initial pressure of 40 pounds per square inch of hydrogen gas. After two hours, the absorption of hydrogen ceased. The aqueous solution was filtered and the filtrate evaporated to dryness on a steam bath to give 16.7 parts (96% yield) of meta-diaminocyclohexane dihydrochloride. The product was identical by infra-red analysis to a synthetic standard. Neutralization of the product with caustic yielded meta-diaminocyclohexane.

EXAMPLE III

To the apparatus used in Example II, there was charged 10 parts of para-phenylenediamine dihydrochloride (an aliquot of that formed from one mole of para-phenylenediamine and two moles of hydrochloric acid) dissolved in 100 parts of water. The solution was hydrogenated at 90–100° C. over 0.1 part of platinum catalyst at 40 p.s.i. of hydrogen until hydrogen absorption ceased (22 min.). The product was filtered to recover the catalyst and the filtrate and evaporated to dryness to give 10.2 parts (100%) of paradiaminocyclohexane dihydrochloride. Neutralization of the para-diaminocyclohexane dihydrochloride with aqueous caustic gave a quantitative yield of para-diaminocyclohexane.

EXAMPLE IV

Ten parts of p-toluidine sulfate, formed from equimolar quantities of p-toluidine and sulfuric acid was charged to a hydrogenation reactor with 100 parts of water. To the solution there was added 0.05 part platinum dioxide and the mixture hydrogenated at 90–100° C. during ca 0.5 hour at a maintained hydrogen pressure of 39 pounds per square inch. Filtration of the solution followed by neutralization resulted in a 95% yield of p-methylcyclohexylamine.

EXAMPLE V

To a reactor was charged 7.0 parts of 2,4-xylidine and 100 parts of water. Sulfuric acid was added in an equimolar quantity. Then there was added 0.1 part of platinum catalyst and the mixture hydrogenated at 90° C. under 40 pounds per square inch hydrogen pressure. After ca 25 minutes, reaction time, the solution was filtered and the filtrate basified with sodium hydroxide to give a quantitative yield of 2,4-dimethylcyclohexylamine.

EXAMPLE VI

To a reactor was charged 93.1 parts (1 mole) of aniline and 500 parts of water. There was then added 102 parts (1.0 mole) of concentrated sulfuric acid. To the solution was added platinum catalyst and the reaction mixture hydrogenated at 70° C. under 75 pounds per square inch hydrogen for a period of ca 1 hour. Filtration and neutralization of the reaction mixture gave 97% yield of cyclohexylamine.

EXAMPLE VII

Example I, repeated except that phosphoric acid was used in place of sulfuric acid gives comparable results.

EXAMPLE VIII

To a reactor was charged 122.17 g. (1 mole) of 2,4-toluenediamine, 204 g. (2 moles) sulfuric acid and 500 g. of water. To the mixture, there was added 1 gram of 10% palladium on carbon catalyst. The mixture was hydrogenated at 50° C. at 50 pounds per square inch hydrogen pressure during 0.75 hour. The reaction mixture was filtered and the filtrate neutralized to give a 97% yield of 2,4-diamino-methylcyclohexane.

EXAMPLE IX

The process of Example VIII was repeated except that 2,6-toluenediamine was used in place of 2,4-toluenediamine. There resulted a 98% yield of 2,6-diamino-methylcyclohexane.

What is claimed is:

1. Process for the preparation of a cyclohexyl primary amine by liquid-phase hydrogenation, in the presence of an acid resistant hydrogenation catalyst selected from the group consisting of platinum and palladium catalysts, of the corresponding phenyl primary amine comprising hydrogenating until the absorption of hydrogen ceases a mineral acid salt of an aromatic primary amine, said salt containing at least one equivalent of a mineral acid per amine group of said phenyl primary amine, in aqueous solution at a temperature of ambient temperature to 250° C., and a pressure of five to 200 p.s.i.

2. The process of claim 1 wherein said mineral acid is sulfuric acid.

3. The process of claim 1 wherein said mineral acid is hydrochloric acid.

4. The process of claim 1 wherein said aromatic primary amine is meta-phenylenediamine.

5. The process of claim 1 wherein said aromatic primary amine is ortho-aminophenol.

6. Process for the preparation of a cyclohexyl primary amine by liquid-phase hydrogenation, in the presence of an acid resistant hydrogenation catalyst selected from the group consisting of palladium and platinum catalysts of the corresponding phenyl primary amine comprising:

(a) hydrogenating, until the absorption of hydrogen stops, a mineral acid salt of phenyl primary amine said salt containing at least one equivalent of a mineral acid per amine group of said phenyl primary amine in aqueous solution at a temperature of ambient temperature to 250° C., and a pressure of five to 200 p.s.i.;

(b) removing said catalyst from said aqueous solution;

(c) neutralizing said aqueous solution;

(d) recovering said cyclohexyl primary amine.

7. In the process for preparing a cyclohexyl primary amine by the aqueous liquid-phase hydrogenation of a phenyl primary amine in the presence of an acid resistant hydrogenation catalyst selected from the group consisting of palladium and platinum catalyst, the improvement comprising, hydrogenating, until the absorption of hydrogen stops, in the presence of at least one equivalent of a mineral acid per amine group of said primary amine at a temperature of 50–150° C., and a pressure of 5–200 p.s.i.

References Cited
FOREIGN PATENTS 653,760   12/1962   Canada.

CHARLES B. PARKER, Primary Examiner

D. R. PHILLIPS, Assistant Examiner

U.S. Cl. X.R.

260—690